United States Patent Office 3,196,999
Patented July 27, 1965

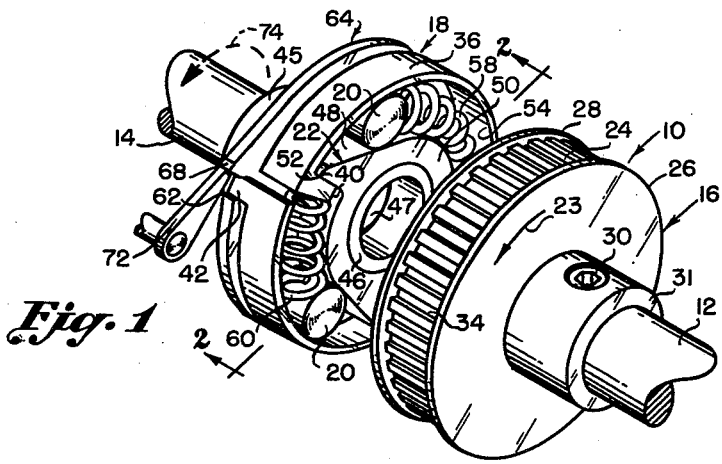
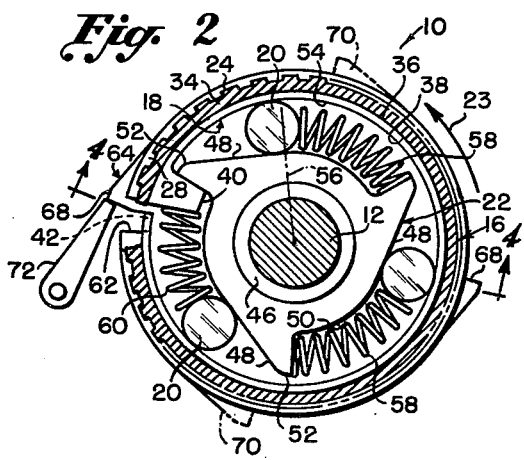
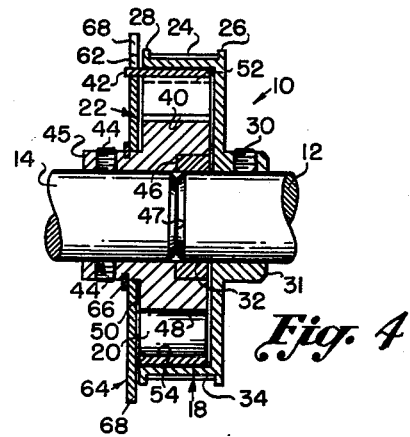
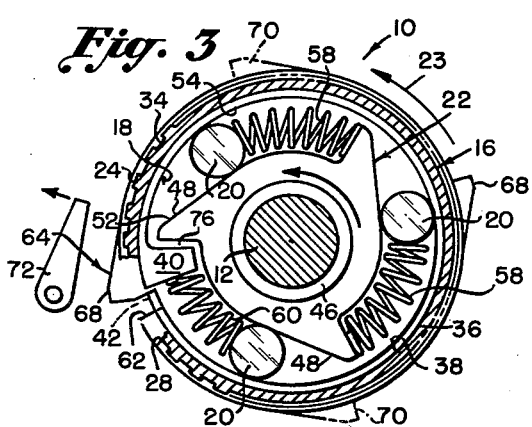
July 27, 1965    W. F. BRADBURY    3,196,999
INTERMITTENT CLUTCH WITH FRICTION BAND
OPERATED BY ROLLING MEANS AND CAM
Filed Jan. 22, 1963
INVENTOR.
WILBURN F. BRADBURY
BY
*Strauch, Nolan & Neale*
ATTORNEYS

3,196,999
INTERMITTENT CLUTCH WITH FRICTION BAND OPERATED BY ROLLING MEANS AND CAM
Wilburn F. Bradbury, Northbrook, Ill., assignor to SCM Corporation, New York, N.Y., a corporation of New York
Filed Jan. 22, 1963, Ser. No. 253,135
10 Claims. (Cl. 192—27)

This invention relates to mechanical clutches and more specifically to high speed, intermittent, unidirectional positive-action clutches.

Intermittent, or stop-start, clutches used in printing telegraph apparatus preferably should have a driven member capable of being effectively locked in a positive driving condition and alternately maintained in a positive idling position without relative movement, play, or slippage in either direction. Although accurate positioning is achieved by many prior art intermittent clutches, they are quite complex and are generally limited in operational speeds, utilizing such mechanisms as intermittent gearing, ratchets, intricate lever linkages, lever and solenoid combinations, and variations of Geneva movements.

To achieve a high speed reliable intermittent clutching action, the clutch of the present invention has a continuously rotating, constant speed driving drum which frictionally contacts a spring-like, C-shaped clutch band adjacent the inner surface of the drum. Wedging rollers are positioned to contact the inner surface of the band and to bear against cam surfaces on a central driven cam sprocket. Relative rotation between the band and the sprocket causes the rollers to roll into or out of positive wedging engagement between the band and the sprocket to respectively engage or disengage the clutch. To produce the desired intermittent operation of the clutch, an axially extending lug is provided on the band to control the relative rotation of the band with respect to the driven cam sprocket to effect clutch engagement and disengagement. Finally, an inwardly extending lug on the band is provided primarily to engage an abutment on the driven cam sprocket to ensure the desired positive positioning operation of the clutch.

Accordingly, a primary object of this invention resides in the provision of an improved intermittent clutch having a consistent, positive positioning operation.

Further objects of this invention include:

(1) The provision of an intermittent clutch having a simpler construction than that utilized in intermittent clutches of the prior art;

(2) The provision of a one-way clutch having an area of contact between frictionally engaged components that is substantially greater than that of comparable prior art clutches thereby decreasing the engaging time of the clutch and also increasing its operative life;

(3) The provision of a controllable intermittent clutch wherein engaging time is directly proportional to clutch speed and not dependent upon springs of other special engaging structure;

(4) The provision of a one-way wedging-type clutch wherein the engaging and disengaging action wedges and unwedges all components simultaneously to ensure positive positioning operation; and (5) The provision of a clutch wherein the rotating components are mounted in a unique manner to ensure coaxial alignment thereof.

These and other objects will appear from the following description and appended claims when read in conjunction with the accompanying drawings wherein:

FIGURE 1 is a perspective, partially exploded view of a clutch made in accord with the present invention, the driving member being illustrated spaced apart from the driven member for clarity;

FIGURE 2 is a transverse cross section of the assembled clutch taken on line 2—2 of FIGURE 1 and shows the idling clutch condition;

FIGURE 3 is a transverse cross section similar to FIGURE 2 and illustrates the engaged condition of the clutch;

FIGURE 4 is a longitudinal cross section of the clutch taken on line 4—4 of FIGURE 2; and FIGURE 5 is a longitudinal cross section of a modified clutch embodiment made in accord with the present invention.

Referring to FIGURES 1 through 4, a clutch 10 is employed as an intermittent, positive action coupling between a drive shaft 12 and a work shaft 14. The major components of the clutch power transmission train include a driving drum 16 rigidly mounted on drive shaft 12, a generally C-shaped clutch band 18 in frictional contact with the interior surface of drum 16, a cam sprocket 22 rigidly secured to the work shaft 14, and rollers 20 positioned for wedging engagment between the clutch band 18 and the cam sprocket 22. The driving drum 16 is continuously rotated in a counterclockwise direction indicated by arrow 23 in FIGURES 1 to 3 by drive shaft 12 which may derive its rotation from a suitable power source (not shown). Alternatively, drive power can be furnished by a motor with a belt and pulley arrangement (not shown), the belt having teeth engaging the teeth 24 on the exterior surface of drum 16 between integral flanges 26 and 28 thereof. Work shaft 14 is connected to a mechanism (not shown) requiring an intermittent rotary power input. In telegraphic equipment, shaft 14 can be a cycling function shaft.

Details will be described with reference primarily to FIGURE 1, but various inter-related structure can be better understood with reference to FIGURES 2 to 4 as well as to FIGURE 1. The driving drum 16 is rigidly secured to drive shaft 12 by means of one or more set screws 30 threaded into the hub 31 of the drum with end 32 of shaft 12 projecting into the interior of drum 16, as shown in FIGURE 4. A disc-like main drum flange 26 extends radially outwardly from the drum hub 31 to integrally connect with a cylindrical rim flange 34 which includes the aforedescribed pulley teeth 24 on its exterior surface and the radial flange 28 at its overhanging end.

The clutch band 18 is a resilient, spring-like, C-shaped member fitting in drum 16 with a light, expansive, spring-biased, frictional fit between the exterior surface 36 of the band and the interior surface 38 of the drum. At one end of the C-shaped clutch band 18, lug 40 extends radially inwardly for purposes described hereinafter. At the other end of the clutch band 18, second lug 42 extends parallel to the axis of rotation of the clutch and in a direction away from the main drum flange 26 (see FIGURE 4) to project beyond the edge of the drum.

Cam sprocket 22 is rigidly secured to work shaft 14 by set screws 44 and, in the assembled clutch, the end 32 of drive shaft 12 extends into a bushing 46 pressed into sprocket 22 to abut the end 47 of work shaft 14. This arrangement of shafts, sprocket and bushing maintains the clutch components in concentric alignment at all times. Furthermore, the cam sprocket 22 has a plurality of identical cam surfaces 48 (three being illustrated) which are tangential to the generally cylindrical central portion 50 of the cam sprocket. Associated with each cam surface is an abutment or dog 52 extending radially outwardly from the central portion 50 for purposes described hereinafter.

A wedging roller 20 is positioned in engagement between each of the cam surfaces 48 of sprocket 22 and the interior surface 54 of clutch band 18. The rollers are positioned to contact cam surfaces 48 at points which are slightly offset counterclockwise from a radius of cam sprocket 22, such as 56 in FIGURE 2, perpendicular to a cam surface 48. Rollers 20 are urged to the offset position by light compression coil springs 58 and 60 which respectively bear against abutments 52 of the cam sprocket or the radial lug 40 of clutch band 18.

The axial lug 42 on clutch band 18 is engaged in a notch 62 provided in the periphery of a stop plate 64, the plate 64 being rotatably retained on the hub 45 of cam sprocket 22 by means of a retaining ring 66. Stop plate 64 is provided with a plurality of peripheral stop lugs 68, two such stop lugs being shown in solid lines in FIGURES 1 to 4 while the location of two additional stop lugs is indicated by phantom outlines at 70 in FIGURES 2 and 3. This is merely an indication that any number and spacing of stop lugs can be employed around the periphery of the clutch stop plate depending on the manner in which the clutch is to be used. Stop lugs 68 are selectively engaged by a stop lever 72 which may be rotated into and out of engagement with the stop lugs by any suitable means, e.g. an electro-magnet (not shown).

Operation

When the clutch of the present invention idles, as shown in FIGURES 1 and 2, there is a continual frictional drag between the interior surface 38 of the driving drum 16 and the exterior surface 36 of the clutch band 18 due to the expansive spring-bias of the clutch and the light idling wedging force of rollers 20. However, the clutch band is prevented from rotating with the drum because its axial lug 42, engaged in the stop plate 64, is prevented from moving by abutment of a stop plate lug with stop lever 72. The fractional drag tending to pull the band away from axial lug 42 tends to collapse the band 18 between rollers 20 during the idling period of the clutch 10.

When the stop lever 72 is moved away from the path of the stop lugs 68, the clutch band 18 will start to rotate counterclockwise with drum 16, due to the frictional drag therebetween. As the clutch band 18 is a light weight member and the frictional drag between the band and the driving drum is appreciable relative thereto, the acceleration of clutch band 18 to the driving speed of drum 16 is substantially instantaneous. This counterclockwise rotation of clutch band 18 rolls the rollers 22 in a counterclockwise direction along the tangential cam surfaces 48 of the sprocket, which due to inertia tends to momentarily remain stationary, into tight wedging relationship between the cam sprocket 22 and the clutch band 18. This wedging action so increases the engaging forces between the clutch components that a positive frictional wedging lock is established between the drum, the band, the rollers, and the cam sprocket to drive the work shaft 14 in the direction indicated by dashed arrow 74. As can be seen in FIGURE 3, this relative rotation between band 18 and cam sprocket 22 which occurs upon clutch engagement is evidenced by the gap at 76 which develops between the radial lug 40 of clutch band 18 and the adjacent abutment 52 of the cam sprocket when the clutch is engaged.

The clutch 10 will continue to rotate in an engaged condition until the stop lever 72 is again positioned in the path of one of the stop lugs 68 on stop plate 64. When this occurs, the clutch stop plate 64 and the axial lug 42 of band 18 engaged therein will be instantly stopped thereby collapsing and stopping rotation of the axial lug 42 end of clutch band 18. Inertia of the load, work shaft 14, and cam sprocket 22 causes the cam sprocket to tend to continue its motion for a small increment of rotation, until the sprocket abutment 52 adjacent the radial lug 40 strikes the lug. This increment of relative rotation between cam sprocket and the clutch band will roll the rollers 20 back along their associated cam surfaces 48 to the idling position shown in FIGURE 2. During the disengaging action of the clutch components, the radial force which existed between the clutch band 18 and the driving drum 16 is reduced as the roller wedging action is removed so that the light idling frictional drag between the drum and the band is reestablished.

The above-mentioned engagement by lug 40 and the adjacent abutment 52 at the end of the disengaging action of the clutch is effective to smoothly but positively stop the work shaft and load as the spring-like clutch band can resiliently collapse around the three rollers to absorb the inertia of the disengaged work shaft and load.

When the clutch is in the idling condition shown in FIGURE 2, the work shaft 12 and its cam sprocket 22 are prevented from rotating in a counterclockwise direction by the abutment of dog 52 with lug 40. Clockwise rotation of sprocket 22 is prevented because the normal force between rollers 20 and flat cam surfaces 48 produces a counterclockwise turning moment on sprocket 22 about the work shaft 14 due to the location of rollers 20 in positions offset counterclockwise from the radii which are perpendicular to the cam surfaces 48, such as radius 56. Thus, the work shaft 14 is held in a predetermined, fixed position while the clutch is idling without any undesirable hunting of the work shaft and without the necessity for additional structure such as a detent mechanism to prevent reverse rotation of the work shaft.

The engaging time of the clutch of the present invention is directly proportional to the speed of the driving drum since it is the rotation of clutch band 18 with driving drum 16 relative to cam sprocket 22 which effects the wedging engaging action. It is desirable to minimize the engaging time of an intermittent clutch employed in printing telegraph apparatus, and when a clutch according to the present invention is to be operated at high rotational speeds, the components can be proportioned so that the relative rotation of the clutch band with respect to the cam sprocket may be 7° or less thus effecting a correspondingly short engaging period. When the present clutch is so proportioned, the wedging forces are great because of the very small wedging angle between cam surface 48 and the inner surface 54 of the band. Such high wedging forces are permissible at high rotational operating speeds of the clutch because the work shaft will have sufficient rotational inertia to effect disengagement of the clutch when the stop lever engages the stop plate to initiate disengagement.

At lower operating speeds, the clutch may be designed to permit smaller relative movement between clutch band 18 and the cam sprocket 22 so that the wedging force of rollers 20 will be decreased due to the increased wedging angle between the cam surface 48 and the clutch band 18. The rotational inertia of the work shaft operating at such reduced speeds will then still be sufficient to effect disengagement of a clutch so designed. However, the engaging relative rotation between the band and sprocket must be limited to less than approximately 15° or else the wedging angle becomes so large that proper wedging of rollers 20 cannot be effected.

Modification

As shown in FIGURE 5, a cam sprocket 118 of a modified intermittent clutch 110 is mounted on a through work shaft 112. A driving drum 114 is rotatably mounted upon a bearing hub 116 of the cam sprocket which is suitably provided with an oil groove 120. The drum 114 is machined from bronze or a similar bearing material, is rotatably retained on hub 116 by retaining ring 126 mounted thereon, and has a toothed pulley wheel 122 fixed thereto by a key 124 or some similar means. Pulley wheel 122 is driven by a suitable motor and belt arrangement (not shown).

A C-shaped, spring-like clutch band 128 frictionally contacts the inner surface of drum 114 and has an inwardly projecting lug 127 at one end and an axially projecting lug 129 at its other end. Wedging rollers 130 engage the inner surface of band 128 and also engage tangential cam surfaces 131 on cam sprocket 118. Axial lug 129 of the clutch band is retained in a notch in the periphery of a stop plate 132 having stop lugs 134 engageable by a stop lever (not shown). Hub 116 of cam sprocket 118 is rotatably secured to work shaft 112 by set screws 136.

The clutch of FIGURE 5 further includes compression springs to maintain the rollers in wedging position and radially extending abutments 140 on the cam sprocket, all in a manner similar to that previously described for the embodiment of FIGURES 1–4. The operation and proportioning of the operating components of the clutch is the same as that above described for the clutch of FIGURES 1–4.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A stop-start clutch comprising:
   (a) a rotatable driving drum;
   (b) a driven sprocket within said drum having tangential cam surfaces;
   (c) a band positioned within said drum for frictional contact with the interior surface thereof;
   (d) wedging means positioned between said band and said cam surfaces to intermittently urge said band into driving contact with said drum and to rotate said drive member therewith; and
   (e) means to selectively prevent rotation of said band while said drum is rotating in frictional contact therewith to effect disengagement of said clutch.

2. A clutch as defined in claim 1 wherein said band is a resilient C-shaped member in spring-biased contact with the interior surface of said drum.

3. A clutch as defined in claim 1 wherein said sprocket includes bearing means to coaxially, rotatably mount said sprocket within said drum.

4. A clutch as defined in claim 1 wherein said sprocket includes a plurality of radially extending abutments and wherein a plurality of coil springs are respectively positioned between said abutments and said wedging means to urge said means into wedging contact between said sprocket and said band.

5. A clutch as defined in claim 1 wherein said wedging means are a plurality of cylindrical rollers.

6. A clutch as defined in claim 1 wherein said means to selectively prevent rotation of said band comprises a lug on said band extending clear of said driving drum, a stop plate mounted coaxially with said drum and sprocket and having a notch to receive said lug of said band and at least one stop lug at the periphery thereof, and a stop lever engageable with said stop lug.

7. A clutch as defined in claim 1 wherein said band has a lug extending radially inwardly and wherein said sprocket has an abutment extending radially outwardly adjacent said lug for contact therewith to limit rotation of said sprocket relative to said band during disengagement of said clutch.

8. A clutch as defined in claim 1 wherein said drum is directly driven by a belt running on the exterior cylindrical surface thereof.

9. A stop-start clutch comprising:
   (a) a rotatable driving drum;
   (b) a driven sprocket having bearing means to coaxially, rotatably mount said sprocket within said drum and having a plurality of radially outwardly extending abutments and a plurality of tangential cam surfaces;
   (c) a C-shaped resilient band positioned within said drum for frictional contact with the interior surface thereof and having a lug at one end extending radially inwardly adjacent one of said abutments of said sprocket and another lug at the opposite end of said band extending clear of said driving drum;
   (d) a plurality of cylindrical rollers positioned between said band and said cam surfaces;
   (e) a plurality of coil springs respectively positioned between said abutments and said rollers to urge said rollers into wedging contact between said sprocket and said band, one of said springs abutting said inwardly extending lug of said band;
   (f) a stop plate mounted coaxially with said drum and sprocket and having a notch to receive said other lug of said band and at least one stop lug at the periphery thereof; and
   (g) a stop lever engageable with said plate stop lug to prevent rotation of said band and driven member.

10. A stop-start clutch comprising:
   (a) a rotatable driving member having a cylindrical surface coaxial with its axis of rotation;
   (b) a rotatable driven member at least a portion of which is disposed in concentric relationship to said cylindrical surface;
   (c) means mounting said driving and driven members so their axes of rotation are coaxial;
   (d) means disposed between said portion of said driven member and said cylindrical surface of said driving member to enable selective drive force transfer engagement between said driving member and said driven member comprising:
      (1) a light weight friction band concentric with and between said portion of said driven member and said cylindrical surface of said driving member and in frictional engagement with said cylindrical surface;
      (2) wedging means disposed between and engaging both said light friction band and said portion of said driven member; and
      (3) means integral with said friction band in abutment engagement with said portion of said driven member; and
   (e) means to selectively prevent rotation of said friction band while said drum is rotating in frictional contact therewith to effect disengagement of wedging action of said wedging means between said friction band and said portion of said driven member and, through said means in abutment engagement with said portion of said driven member, to block rotation of said driven member.

References Cited by the Examiner

UNITED STATES PATENTS

| 1,052,040 | 2/13 | Cook | 192—45 |
| 1,090,444 | 3/14 | Barnard | 192—26 |
| 1,857,253 | 5/32 | Miller et al. | |
| 2,428,968 | 10/47 | Gruenberg | 192—45.1 |
| 3,044,590 | 7/62 | Madsen | 192—26 |
| 3,087,587 | 4/63 | Flieg | 192—26 |

FOREIGN PATENTS

| 1,088,396 | 9/54 | France. |
| 719,589 | 4/42 | Germany. |

DAVID J. WILLIAMOWSKY, *Primary Examiner.*